(12) United States Patent
Tosaki et al.

(10) Patent No.: US 6,633,534 B1
(45) Date of Patent: Oct. 14, 2003

(54) OPTICAL DISK AND OPTICAL DISK DRIVE

(75) Inventors: Yoshihiro Tosaki, Osaka (JP); Akira Matsubara, Kyoto (JP); Tomiharu Hosaka, Kyoto (JP); Toshiaki Kunieda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/744,238

(22) PCT Filed: Jul. 28, 1999

(86) PCT No.: PCT/JP99/04038

§ 371 (c)(1),
(2), (4) Date: Mar. 20, 2001

(87) PCT Pub. No.: WO00/07182

PCT Pub. Date: Feb. 10, 2000

(30) Foreign Application Priority Data

Jul. 28, 1998 (JP) ............................................ 10-212515

(51) Int. Cl.[7] .................................................. G11B 7/24
(52) U.S. Cl. ................................. 369/275.3; 369/275.4; 380/201; 386/94; 705/57; 713/193
(58) Field of Search ................. 369/275.3, 14, 369/275.4, 84; 386/94, 126; 380/201, 203; 705/57; 713/193

(56) References Cited

U.S. PATENT DOCUMENTS

| | | | | |
|---|---|---|---|---|
| 5,400,319 A | * | 3/1995 | Fite et al. | 369/275.5 |
| 5,661,703 A | * | 8/1997 | Moribe et al. | 369/14 |
| 5,818,812 A | * | 10/1998 | Moribe et al. | 369/275.1 |
| 6,266,299 B1 | * | 7/2001 | Oshima et al. | 369/13 |
| 6,414,913 B1 | * | 7/2002 | Kobayashi et al. | 369/14 |

FOREIGN PATENT DOCUMENTS

| | | | |
|---|---|---|---|
| JP | 5-120733 | 5/1993 | |
| JP | 6-302092 | 10/1994 | |
| JP | 7-176080 | 7/1995 | |
| JP | 8-115559 | 5/1996 | |
| JP | 9-081938 | 3/1997 | |
| JP | 9-274774 | 10/1997 | |
| JP | 9-306097 A | * 11/1997 | .............. 369/275.3 |
| JP | 10-49986 A | * 2/1998 | .............. 369/275.3 |
| JP | 10199032 | 7/1998 | |

OTHER PUBLICATIONS

English language abstract of JP 9–274774.
English language abstract of JP 5–120733.
English language abstract of JP 10–199032.
English language abstract of JP 9–081938.
English language abstract of JP 8–115559.
English language abstract of JP 7–176080.
English language abstract of JP 6–302092.

* cited by examiner

Primary Examiner—Tan Dinh
(74) Attorney, Agent, or Firm—Greenblum & Bernstein, P.L.C.

(57) ABSTRACT

A write-once DVD 1 has a lead-in area 4 provided inside a data area 5 where digital information on a document, image sound or the like is recorded, which includes prepits 9 holding copy managing key information for preventing unauthorized copy from a source disk to the DVD 1. The DVD has also a test area 3 provided inside the lead-in area 4, which is used for adjusting the power characteristics of the DVD 1. In the DVD 1, information recorded in the source disk can be. physically prevented from being copied into the DVD 1 without good cause on the basis of the copy managing key information recorded in the prepits 9.

10 Claims, 8 Drawing Sheets

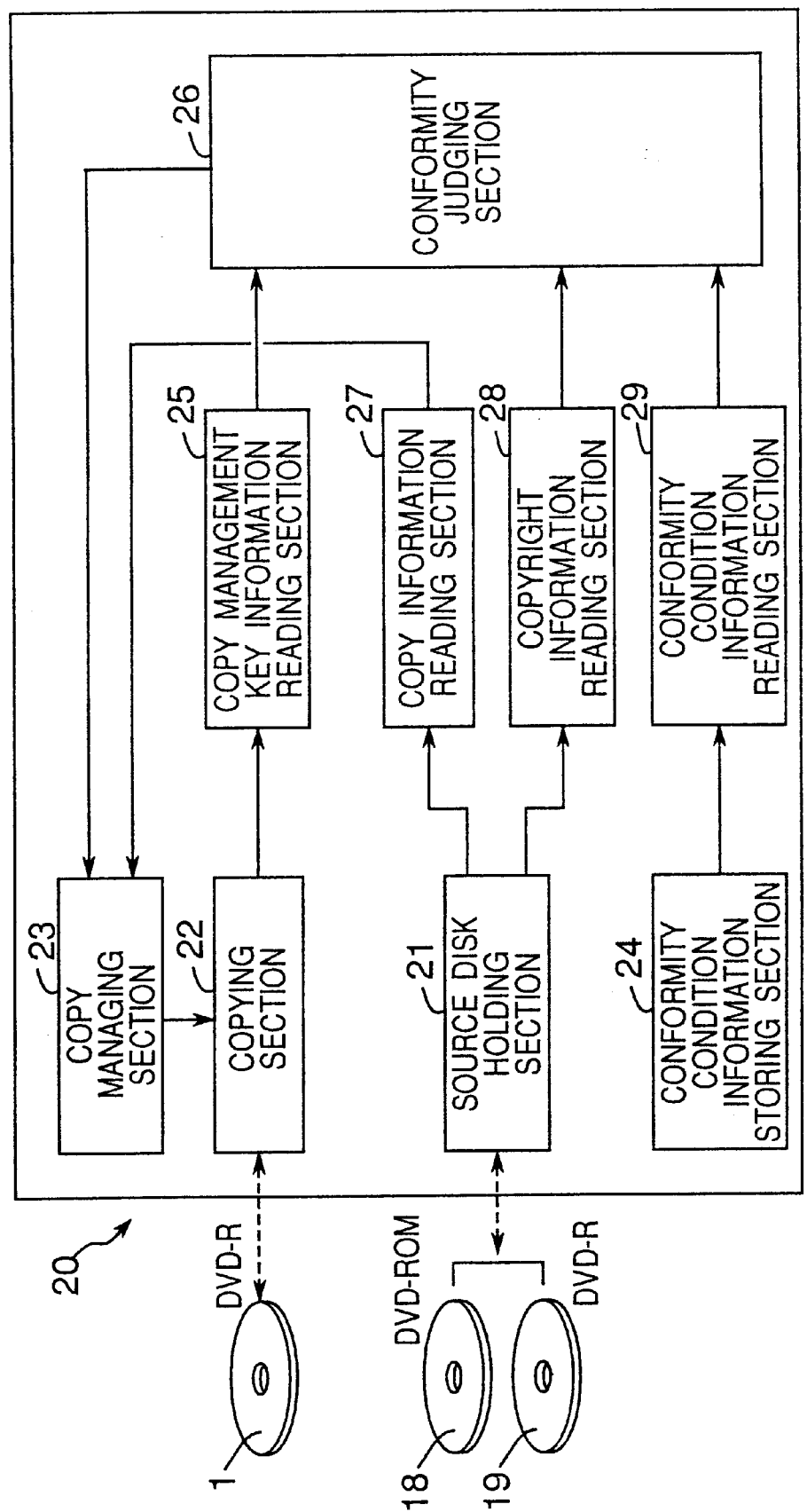

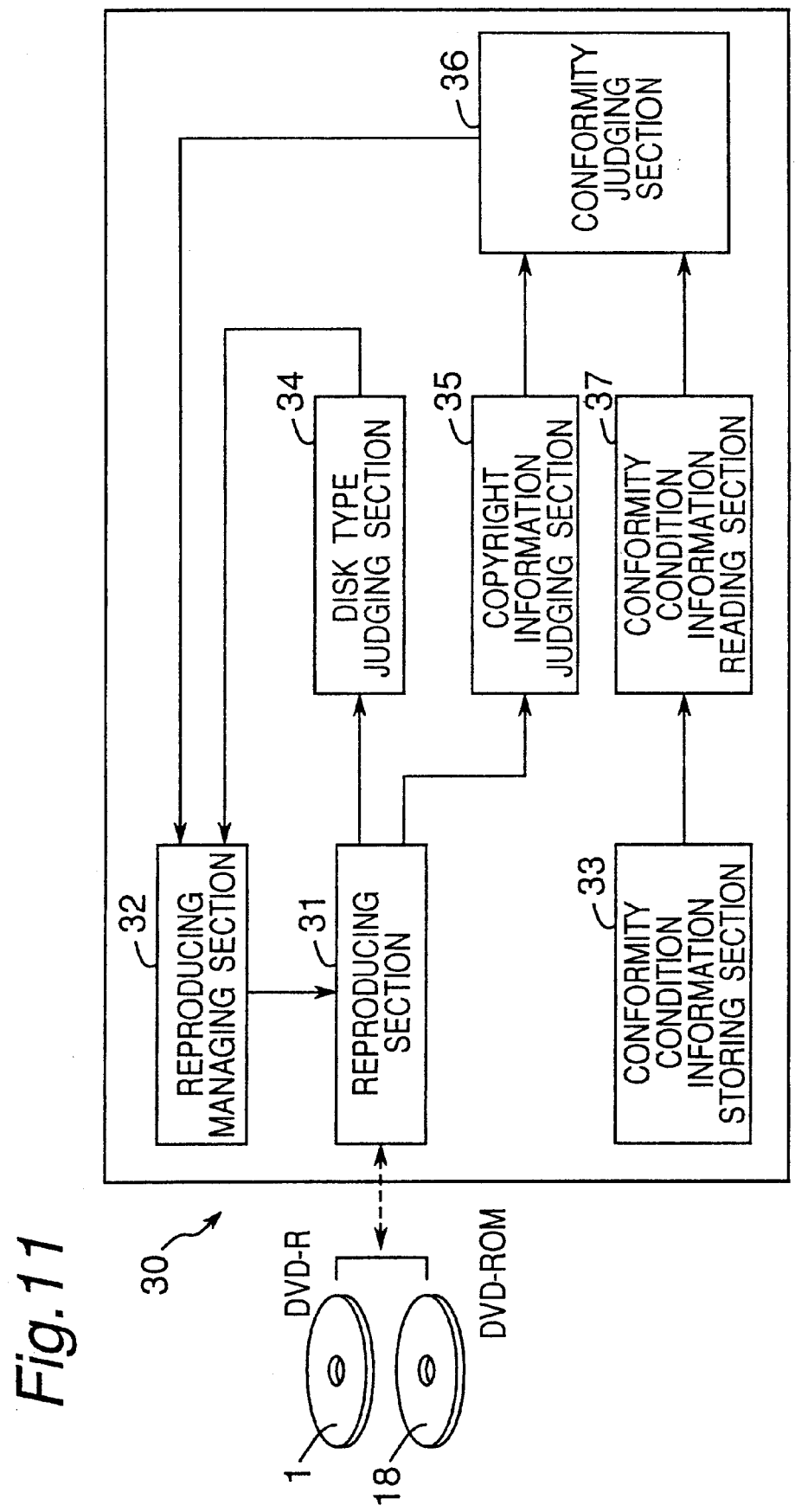

OPTICAL DISK AND OPTICAL DISK DRIVE

TECHNICAL FIELD

The present invention relates to an optical disk into which information can be written, such as a write-once optical disk or the like, which can be managed so as to protect the copyright of information recorded in a read-only optical disk or the like, for example so as to prevent unjust copying of the information, and relates to an optical disk drive for recording information into the optical disk or reproducing the recorded information.

BACKGROUND ART

In recent years, there has been widely used an optical disk for recording various digital information on document, image, video, voice, sound or the like in such a manner that the information can be read using laser rays. The above-mentioned optical disk has various advantages such as higher recording density, shorter access time, higher durability against disturbance due to electromagnetic field or the like, and longer living time, in comparison with a conventional magnetic recording medium such as a magnetic disk or the like. As the optical disk described above, there may be concretely pointed out, for example, a DVD (Digital Versatile Disk) which is suitable for recording video information (AV data) or data for computer use etc., or a CD (Compact Disk) which is suitable for recording audio information or document data etc.

As one of the above-mentioned optical disks, there has been known an optical disk into which a user can write information (hereinafter, called "writable optical disk")), for example a write-once optical disk into which the user can write information once only (for example, a write-once DVD (DVD-R), a write-once CD (CD-R) or the like). Among the above-mentioned various writable optical disks, the write-once optical disk is suitable for being used as a mass storage file for a document data or image data, because it can stably store the written information for a long time (for example, several ten years).

Meanwhile, as for the conventional writable optical disk such as the CD-R or RW, for example the write-once optical disk, the user can copy information recorded in another optical disk to the writable optical disk by reconstructing a normal optical disk drive with a recording function (writing function). Accordingly, from a physical point of view, the user can arbitrarily copy various information recorded in an optical disk acting as an information source (hereinafter, called "source disk") such as a read-only optical disk on the market, to the writable optical disk.

However, in general, the information recorded in the source disk is a literary property produced by a specified literary worker. In this case, as a rule, the literary worker has a copyright for the information of the literary property, in accordance with the provision of the copyright law or the like. Therefore, such an action as to copy the information recorded in the source disk to the writable optical disk without a just reason, is an illegal action as a rule. Thus, it cannot be denied that the regulation for the above-mentioned action is a matter which should be legally solved by adjusting the legislation for the intellectual properties, on one hand. However, on the other hand, it may be said that the above-mentioned illegal action is caused or facilitated by such a fact that the information of the source disk can be physically copied to the writable optical disk with ease, if an optical disk drive on the market is used. That is, in the conventional optical disk or optical disk drive, there may exist such a problem that it is impossible to physically prevent the information of the source disk from being illegally copied or utilized.

Besides that, in the conventional writable optical disk, there exists also such a problem that it is impossible to sufficiently manage the disk information when the information is read or written, namely it is impossible to sufficiently construct a system for managing the disk information. Because ID (Identification) information for each disk or ID information relating to the information to be recorded into the disk is not treated, the function for protecting the copyright, which includes electronic delivery or the like, is not provided. Therefore, there exists such a problem that it is impossible to construct a system for managing disk information in the electronic information circulation using a communication means such as a network or satellite etc., or to construct an organization for managing information to be read or written except coping organization in the aspect of an organization for managing sensitive information of the user disk.

DISCLOSURE OF INVENTION

The present invention, which has been achieved to solve the conventional problems described above, has an object to provide an optical disk or optical disk drive, which can physically prevent the information recorded in the source disk from being copied without a just reason, and further which can sufficiently manage the disk information.

According to the first aspect of the present invention, which has been achieved to solve the above-mentioned problems, there is provided an optical disk, in which (a) requisite information (information to be conserved) of digital type can be written into a recording layer in such a manner that the requisite information can be read using a light, the optical disk including, (b) a data area having a groove extending along a spiral track (getting on the track), the data area being able to record the requisite information in the recording layer within the groove, (c) a lead-in area disposed at a position preceding the data area, the lead-in area being able to record information for managing the optical disk, and (d) a pre-groove area (for example, a test area used for adjusting power characteristics of the optical disk) disposed at a position preceding the lead-in area, the pre-groove area having a pre-groove extending along the track (getting on the track), characterized in that (e) a prepit section is provided at a position corresponding to the track within the lead-in area, the prepit section including at least prepits which have previously stored key information (hereinafter, referred to "copy management key information") relating to a regulation (prevention) against copying information into the optical disk, and other prepits which have previously stored information (hereinafter, referred to "disk type identifying information") for identifying whether the optical disk is provided with the prepits. Hereupon, the term "position preceding" means a fore position in the direction that the optical pickup moves forward, namely a position of central side of the optical disk.

Hereupon, it is possible that the disk type identifying information includes ID information at every disk. Meanwhile, the prepits may be formed on a substrate in the form of embossment by means of an injection molding process, or may be formed by means of a process using laser rays.

As the above-mentioned optical disk, for example, there may be pointed out a DVD-R, a CD-R, a DVD-RW, a CD-RW, a DVD-RAM or the like.

Hereupon, the lead-in area may be provided with only a prepit section, or provided with both of a prepit section and a groove.

Further, in order to raise the detecting precision of the signals at the prepits, it is preferable that the width of each of the prepits is set to a value that is larger than or equal to the width of the groove, and is smaller than a half of the track pitch (track pitch×½>prepit width≧groove width). In addition, it is more preferable that the depth of each of the prepits is set to a value that is approximately equal to the depth of the groove.

In this optical disk, the copy management key information and the disk type identifying information have been previously stored in the prepit section. Therefore, when information in another optical disk is copied to the present optical disk, on the basis of the above-mentioned information, the data information can be prevented from being copied if a predetermined condition for allowing the copy is not satisfied. In consequence, by propagating the optical disk according to the present invention (more preferably, by regulating the use of conventional writable optical disks), it may become possible that the information, which is recorded in each of source disks such as read-only optical disks or the like, is physically prevented from being copied without a just reason.

Further, by combining the copy management key information with the disk type identifying information, it may become possible to sufficiently manage the disk information when the information is read or written. That is, it may become possible to construct a sufficient system for managing the disk information. To be concrete, it may become possible to construct an organization for managing the disk information in the disk publishing, or an organization for managing the reading information or writing information except the copying information in the aspect of the organization for managing the secret information of a user disk. For example, on the occasion of the disk polishing, it may be possible to construct such a disk information management as follows. That is, it is set that only trial information can be read. Then, key information is given on the occasion of purchase. Next, it is verified with a prepit information. After that, the whole information is set to be able to read.

On the above-mentioned optical disk, it is preferable that the recording layer is composed of a vapor-deposited pigment film. In the above-mentioned type of optical disk, the recording layer is necessarily formed on the whole surface of the disk. In this case, if most of the prepits are buried with the recording layer, the detecting precision of the signals at the prepits may be lowered. However, if the recording layer is composed of the vapor-deposited pigment film as described above, the vapor-deposited pigment film is formed in the form of a thin film within each of the prepits. Therefore, most of the prepits are not buried with the recording layer so that the detecting precision of the signals at the prepits may be highly raised.

Hereupon, if the optical disk is a DVD, and further if the DVD is provided with a CSS key area disposed in the lead-in area which stores key information (CSS (Content Scrambling System) key information) for deciphering (de-scrambling) the requisite information, which has been ciphered (scrambled) and recorded in the data area, it is preferable that a partial area including the CSS key area in the lead-in area or all of the lead-in area is formed of prepits. The above-mentioned prepits may be formed on the substrate in the form of embossment, or may be formed by means of a process using laser rays.

That is, in the DVD, in general a control area is provided within the lead-in area, and further the CSS key area is provided within the control area. Thus, the requisite information, which has been ciphered and recorded in the data area, is deciphered using the CSS key information and reproduced. Therefore, it is preferable that a portion of the control area including the CSS key area, all of the control area or all of the lead-in area is formed of prepits so that the CSS key information is prevented from copied.

Hereupon, if the modulation factor of each of the prepits in the above-mentioned optical disk is larger than or equal to 30%, the information of disk can be reproduced using a reproducing apparatus. Meanwhile, it is preferable that the jitter (Data to Clock Jitter) is smaller than or equal to 8%.

According to the second aspect of the present invention, there is provided (a) an optical disk drive (for example, optical disk recorder, optical disk player) which can copy (record) data information recorded in an optical disk acting as an information source (namely, source disk), in which the data information has been previously recorded, to a non-recorded optical disk with pripits according to the first aspect of the present invention, the data information being a requisite information, the optical disk drive being characterized in that it includes (b) an information copying inhibiting means which reads key information relating to a copying regulation, stored in a pripit section of the non-recorded optical disk with the prepits and copyright information relating to a copyright (hereinafter, merely referred to "copyright information"), recorded in the source disk to compare the both with each other, and then inhibits the data information from being copied if the key information and the copyright information do not satisfy a predetermined conformity condition (matching condition) Hereupon, as the source disk, for example, there may be pointed out a read-only DVD, a recorded write-once DVD, read only CD or the like.

In the optical disk drive, it is preferable that it is further provided with a copyright information writing means for writing the copyright information in the source disk, or information formed by combining (hybridizing) the copyright information with the information stored in the prepit section, into the optical disk with the prepits, when the data information recorded in the source disk is copied to the optical disk with the prepits.

In the optical disk drive, it is physically impossible to copy the information in the source disk to the optical disk with the prepits, if the copy management key information in the optical disk with the prepits and the copyright information in the source disk do not match to each other. Therefore, if the above-mentioned conformity condition is set to such that the condition is satisfied only when the information of the source disk is permitted to be copied into the optical disk with the prepits, the information recorded in the source disk can be physically prevented from being copied to the optical disk with the prepits without a just reason. Further, it may become possible to sufficiently manage the disk information when the information is read or written. That is, it may become possible to construct a sufficient system for managing the disk information.

According to the third aspect of the present invention, there is provided with an optical disk drive (a) which can reproduce data information recorded in each of a read-only optical disk and a recorded optical disk with prepits according to the first aspect of the present invention, to which the data information has been copied using an optical disk drive according to the second aspect of the present invention, the optical disk drive being characterized in that it includes (b) an optical disk type judging means for judging whether an optical disk from which recorded data information is to be reproduced is the read-only optical disk or the recorded optical disk with the prepits, and (c) a means for inhibiting the recorded data information from being reproduced, wherein if the optical disk from which the recorded data information is to be reproduced is the read-only optical disk, the recorded data information is allowed to be reproduced when the read-only optical disk does not store key information for inhibiting reproduction thereof, but the recorded data information is inhibited from being reproduced when the read-only optical disk stores the key information for inhibiting reproduction thereof, while if the optical disk from which the recorded data information is to be reproduced is the recorded optical disk with the prepits, copyright information relating to a copyright and key information relating to a copying regulation stored or recorded in said optical disk with the prepits are read and compared with each other, and then the recorded data information is inhibited from being reproduced when the both do not satisfy a predetermined conformity condition. Hereupon, as the read-only optical disk, for example, there may be pointed out a read-only DVD, a read-only CD or the like.

Hereupon, the optical disk drive according to the second aspect of the present invention and the optical disk drive according to the third aspect of the present invention may be integrally constructed.

In the optical disk drive, when the information in the recorded optical disk with the prepits is reproduced, reproducing the recorded information is inhibited if the copy management key information and the copyright information do not satisfy the conformity condition. Therefore, if the information, which has been inhibited from being copied to the optical disk with the prepits, is copied to the optical disk with the prepits by mistake, it is physically impossible to reproduce the recorded information. In consequence, the copyright as to the information recorded in the source disk can be strongly protected. Further, it may become possible to sufficiently manage the disk information when the information is read or written. That is, it may become possible to construct a sufficient system for managing the disk information.

BRIEF DESCRIPTION OF DRAWINGS

FIG. 10 is a block diagram showing a rough construction of a DVD recorder according to the present invention.

FIG. 11 is a block diagram showing a rough construction of a DVD player according to the present invention.

BEST MODE FOR CARRYING OUT THE INVENTION

Hereinafter, an embodiment of the present invention will be concretely described. Although a write-once DVD (DVD-R) is to be described as an example of the present embodiment, it is of course that the object of the present invention is not restricted to the write-once DVD, but the present invention may be widely applied to various optical disks into which information can be written, for example, a CD-R, a DVD-RW, a CD-RW, a DVD-RAM or the like.

Figure 1A:
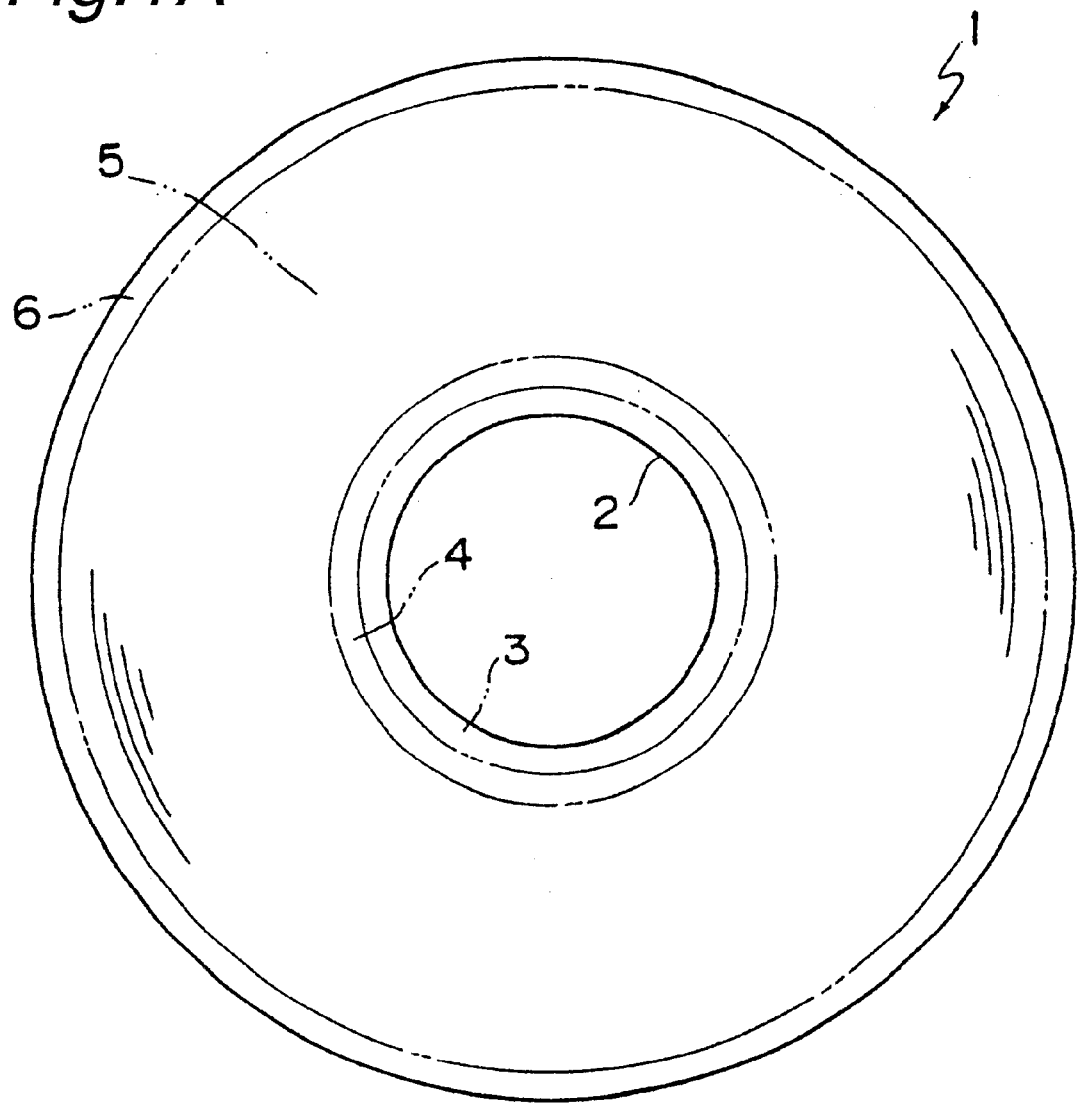
FIG. 1A is a plan view of a write-once DVD according to the present invention.
Figure 1B:
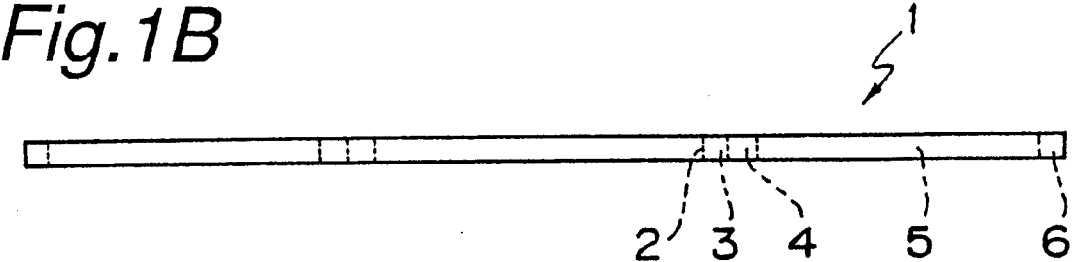
FIG. 1B is an elevational view of the write-once DVD shown in FIG. 1A.

FIGS. 1A and 1B are a plan view and an elevational view of a write-once DVD (Digital Versatile Disk) according to the present invention, respectively. Meanwhile, FIG. 2 is a partially sectioned perspective view of a substrate of the DVD.

Figure 2:
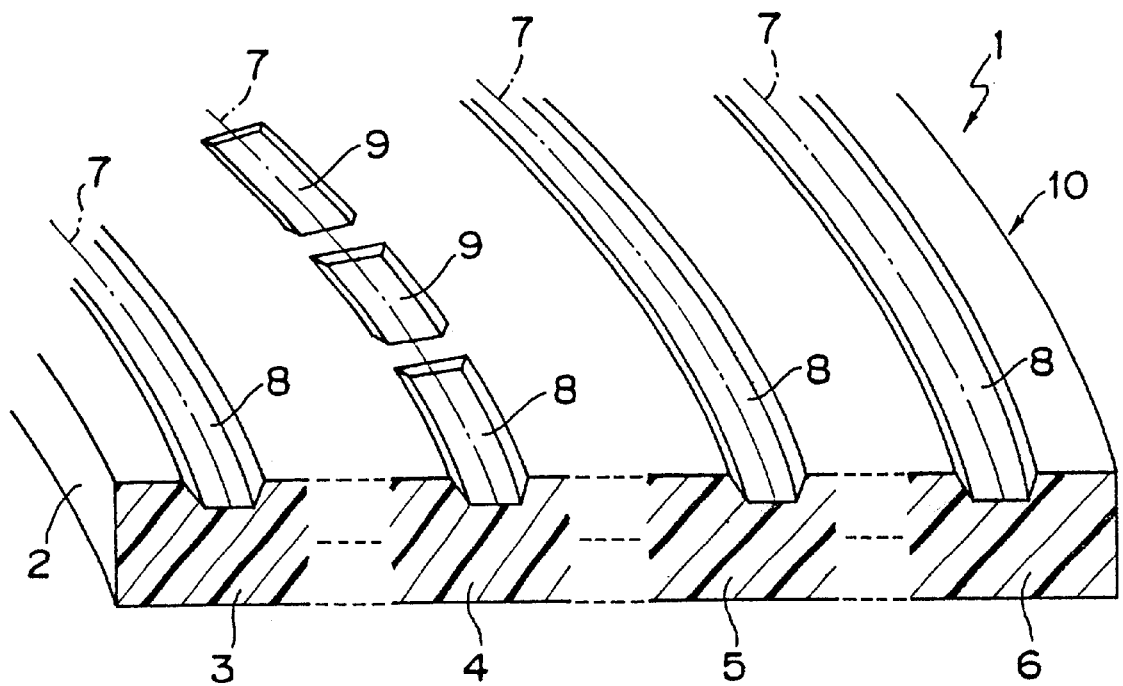
FIG. 2 is a partially sectioned perspective view of a substrate of the write-once DVD shown in FIGS. 1A and 1B.

As shown in FIGS. 1A, 1B and 2, a DVD 1 according to the present invention is formed in a disk shape (in the form of donut plate) while having a predetermined thickness (for example, about 1.2 mm), the DVD being provided with a central hole 2 of a circular shape, disposed at a central portion thereof. Further, the DVD 1 is provided with a test area 3 (pre-groove area), a lead-in area 4, a data area 5 and a lead-out area 6, these areas being concentrically disposed by turns from its center side (inside) to its periphery side (outside).

Hereupon, the radius of the DVD 1 is set to, for example, about 60 mm, while the radius of the central hole 2 is set to, for example, about 15 mm. Thus, the test area 3 is formed, for example, within a region smaller than 22.6 mm in the radial direction. The lead-in area 4 is formed, for example, within a range from 22.6 to 24.0 mm in the radial direction. The data area 5 is formed, for example, within a range from 24.0 to 58.0 mm in the radial direction. The lead-out area 6 is formed, for example, in a region larger than 58.0 mm in the radial direction.

Figure 5A:
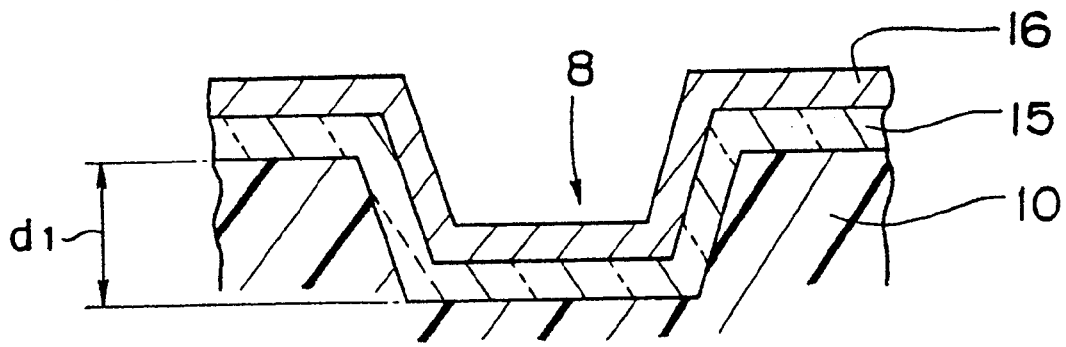
FIG. 5A is an elevational section view of a data area around a groove, of a non-recorded write-once DVD according to the present invention.

Hereupon, the DVD 1 has such a structure similar to a conventional one that a recording layer, a reflecting layer and a covering plate are disposed by turns on a substrate, although it is not shown in detail (see FIG. 5A).

The test area 3 is provided with a groove 8 extending along a screw-shaped (spiral) track 7 on a spreading disk surface, namely getting on the track 7, the area being designed so as to be used for adjusting the power property (power intensity) etc. of the DVD 1. Hereupon, the central line of the groove 8 in the longitudinal direction (circumferential direction) approximately coincides with the track 7. The recording layer in the groove 8 can fundamentally record predetermined digital information by applying laser rays corresponding to the digital information thereto. Thus, the digital information recorded in the recording layer in the groove 8 can be read using the laser rays. However, because the groove 8 in the test area 3 is used only for adjusting the power property of the DVD 1, information is not fundamentally written into the area.

Hereupon, the track 7 is not a material existence, but is a curved line of a spiral shape which is conceptually set on the spreading disk surface. Thus, the track 7 acts as a standard for locating the groove 8 and prepits 9 described later, or a standard for servo control of an optical pickup (objective lens). Each of the groove 8 and the prepits 9 is formed so as to extend along the track 7 (to get on the track 7).

The lead-in area 4 is provided with a prepit section composed of the single groove 8 extending along the track 7 and the plural prepits 9. Hereupon, the groove 8 (recording layer) is used for recording various information for managing the DVD 1, for example, the volume or recording position etc. of the information recorded in the data area 5. The process of recording the information into the recording layer in the groove 8 and the process of reading the information are as same as those described above.

On the other hand, the prepit section (prepits 9) records (stores) key information for copy managing use (key information for preventing copy) relating to the regulation for copying the information to the DVD, and information for identifying the disk type which is used to identify whether the DVD 1 is a DVD with prepits. The information recorded in the prepit section is defined by whether the prepits exist or not, or by the shape of the prepits etc., regardless of the condition of the recording layer (non-recorded or recorded). Therefore, the information, which is different from that of the groove 8, is peculiar to the DVD 1, and is not affected whether the DVD is subjected to a writing operation or not.

The data area 5, which is provided with the single groove 8 extending along the track 7, is used for recording desirable substantial digital information (requisite information) on document, image, video, voice, sound or the like. The process of recording the information into the recording layer in the groove 8 and the process of reading the information are as same as those described above.

The lead-out area 6, which is provided with the single groove 8 extending along the track 7, has a structure fundamentally as same as that of the data area 5. It indicates a boundary (limit) of the data area 5 at the periphery side of the disk, and is provided for recording various control information therein when the information is recorded/reproduced into/from the DVD 1.

Figure 3:
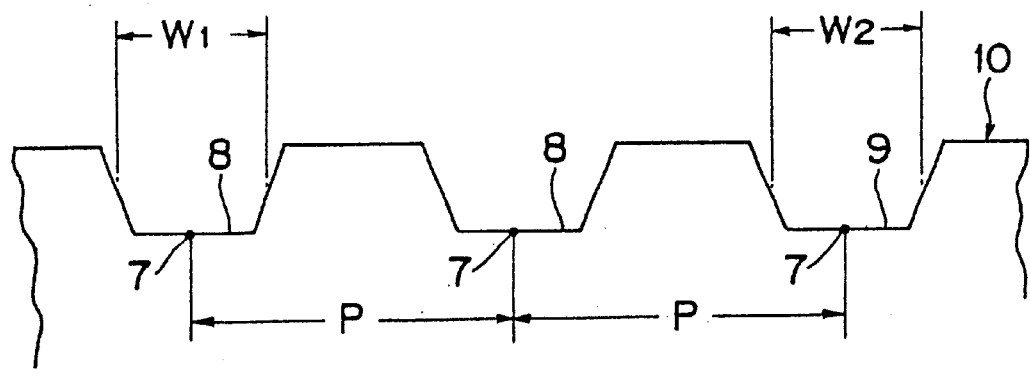
FIG. 3 is a schematic view showing an elevational section of the substrate shown in FIG. 2.

As shown in FIG. 3, on the spreading surface (outer surface) of the substrate 10 of the DVD 1, the groove 8 and the prepits 9 are formed along the track 7. However, the interval of the track 7 in the radial direction of the disk, namely the track pitch P, is set to a value approximately as same as that of the conventional DVD, for example about 0.74 μm. Further, the width $W_1$ of the groove 8 (dimension in the radial direction of the disk) is also set to a value approximately as same as that of the conventional DVD, for example about 0.25–0.3 μm. Hereupon, the width $W_2$ of each of the prepits 9 (dimension in the radial direction of the disk) is set to a value, which is larger than or equal to the width $W_1$ of the groove 8 and is in the range smaller than ½ of the track pitch P. That is, the relation shown by the following expression 1 is established among the groove width $W_1$, the prepit width $W_2$ and the track pitch P.

$$W_1 \leq W_2 < P/2 \qquad \text{Expression 1}$$

$W_1$: groove width
$W_2$: prepit width
P: track pitch

Hereupon, if the prepit width $W_2$ is smaller than the groove width $W_1$, the signal modulation factor is lowered, in consequence signals may not be sufficiently obtained. Meanwhile, if the prepit width $W_2$ is larger than or equal to ½ of the track pitch P, cross-talk is increased so that jitter margin may be narrowed.

In the following Table 1, there are shown results obtained by actually measuring the jitter (Data to Clock Jitter) while changing the prepit width $W_2$ variously, with respect to a DVD in which the volume (line density) is 4.7 GB (the shortest pit length 3T=0.4 μm), the track pitch P being 0.74 μm, and the groove width $W_1$ being 0.25 μm. Hereupon, in the DVD, it may be generally preferable that the jitter of the DVD is smaller than or equal to 8%.

According to the measured results shown in Table 1, it may be understood that it is preferable that the prepit width $W_2$ is set to a value in the range defined by the Expression 1 as for the prepits of normal type.

TABLE 1

Measured Jitter Values (Prepit Width Changed)

| Prepit Width $W_2$ | Measured Jitter |
|---|---|
| 0.21 μm | 8.7% |
| 0.23 μm | 8.5% |
| 0.25 μm | 8.0% |
| 0.30 μm | 7.5% |
| 0.40 μm | 12.0% |

However, the present inventors have found that the jitter values depend on the line density (disk volume) of the DVD, as well as the prepit width $W_2$. That is, the present inventors have experimentally found such a fact that when the groove width $W_1$ is 0.25 μm while the prepit width $W_2$ has a smaller value of 0.18 μm, the jitter value is lowered to 8% if the line density is 3.9 GB (the shortest pit length 3T=0.44 μm) although the jitter value is 13% if the line density is 4.7 GB (the shortest pit length 3T=0.40 μm). Therefore, even if the prepit width $W_2$ is smaller than the groove width $W_1$, the jitter value can be made smaller than or equal to 8% by suitably lowering the line density.

Thus, in the following Table 2, there are shown results obtained by actually measuring the jitter values while changing the line density (the shortest pit length 3T) variously, with respect to a DVD in which the prepit width $W_2$ is set to 0.25 μm, which is identical to the groove width $W_1$. Hereupon, each of the prepits, whose prepit width $W_2$ was smaller, was formed by making the cone angle of the prepit smaller using AZ as a developer.

According to the measured results shown in Table 2, it may be understood that if the prepit width $W_2$ is constant, the smaller the line density (the shortest pit length 3T) becomes, the smaller the jitter value becomes.

TABLE 2

Measured Jitter Values (Line Density Changed)

| Shortest Pit Length 3T | Measured Jitter |
|---|---|
| 0.40 μm | 8.0% |
| 0.44 μm | 7.2% |

TABLE 2-continued

Measured Jitter Values (Line Density Changed)

| Shortest Pit Length 3T | Measured Jitter |
|---|---|
| 0.48 μm | 6.5% |
| 0.60 μm | 5.3% |

Meanwhile, in the following Table 3, there are shown results of the reproducing tests performed for DVDs provided with prepits according to the present invention (Embodiments 1 to 3) and DVDs with prepits which do not belong to the present invention (Comparisons 1 to 2), using a DVD player and a DVD-ROM drive on the market.

TABLE 3

Results of Reproducing Test for DVD

| | DVD Player 1 | DVD-ROM Drive 1 | DVD-ROM Drive 2 |
|---|---|---|---|
| Embodiment 1 | ○ | ○ | ○ |
| Embodiment 2 | ○ | ○ | ○ |
| Embodiment 3 | ○ | ○ | ○ |
| Comparison 1 | X | X | X |
| Comparison 2 | X | X | X |

(Notice)
○: Good Reproducing Action
X: Action Malfunction Caused

Hereupon, the disk specification of each of the DVDs used in the above-mentioned reproducing tests is as follows.

| | | | |
|---|---|---|---|
| (1) Emb. 1 | 3T = 0.40 μm | Jitter 8.0% | Prepit Width 0.25 μm |
| (2) Emb. 2 | 3T = 0.44 μm | Jitter 7.2% | Prepit Width 0.25 μm |
| (3) Emb. 3 | 3T = 0.60 μm | Jitter 5.3% | Prepit Width 0.25 μm |
| (4) Com. 1 | 3T = 0.40 μm | Jitter 13.0% | Prepit Width 0.18 μm |
| (5) Com. 2 | 3T = 0.40 μm | Jitter 12.0% | Prepit Width 0.40 μm |

As apparent from Table 3, in each of the DVDs of Embodiments 1 to 3 according to the present invention, a good reproducing action is obtained, regardless of which reproducing apparatus is used. On the other hand, in each of Comparisons 1 and 2 to which the present invention is not applied, an action malfunction is caused, regardless of which reproducing apparatus is used.

As described above, in the substrate 10, the depths of the groove 8 and the prepits 9 are identical to each other although their widths are different from each other. The reason is to make the production of the substrate (stamper) easier. That is, in general, the substrate 10 is produced using a stamper by means of injection molding, compression molding, 2P method or the like. Hereupon, for example, the stamper 10 is generally produced by means of a process utilizing a photolithography technique as shown in FIGS. 4A to 4F. In this case, if the depth of the groove 8 of the prepit 9 is constant, the stamper may be produced by a single photolithography operation so that the producing step may be simplified, thereby the producing cost of the stamper or substrate, and further the DVD may be reduced.

Hereupon, the producing process of the stamper or substrate 10 utilizing the photolithography technique is roughly as follows.

Figure 4A:
FIGS. 4A to 4F are views showing a process for producing the substrate shown in FIG. 2, respectively.
Figure 4B:
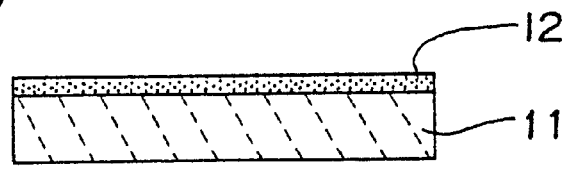

That is, as shown in FIG. 4A, at first, there is prepared a glass substrate 11 having a thickness of about 5 to 6 mm whose spreading surface has been polished. Then, as shown in FIG. 4B, a photo resist 12 of positive type is applied to the spreading surface of the glass substrate 11.

Figure 4C:
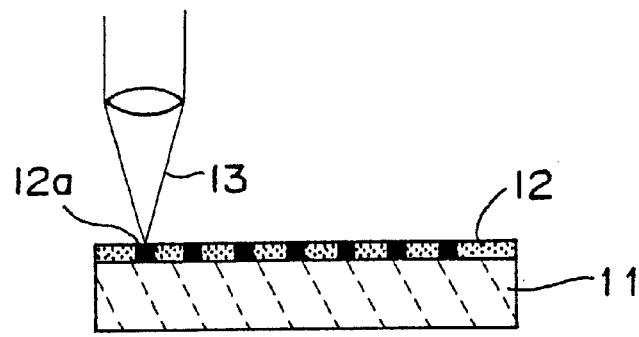

Following that, as shown in FIG. 4C, onto the photo resist 12, laser rays 13 are applied with a pattern corresponding to the shapes of the groove 8 and the prepits 9 which are to be formed on the substrate (patterning exposure is performed). In consequence, a portion 12a of the photo resist 12, to which the laser rays 13 have been applied, becomes a material which can be dissolved into a developer (for example, alkali solution) by a photochemical reaction.

Figure 4D:
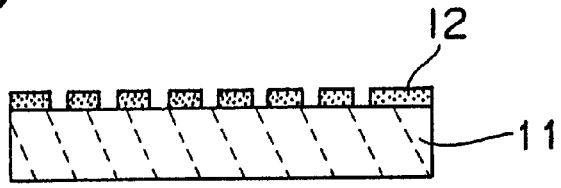
Figure 4E:
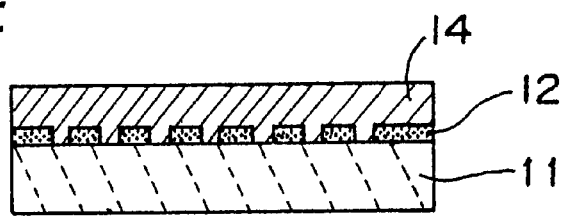

Next, as shown in FIG. 4D, the photo resist 12 is subjected to a developing treatment using the developer (not shown) so that the portion 12a, which can be dissolved into the developer, is removed. Following that, as shown in FIG. 4E, a stamper 14 is produced, by performing nickel plating onto the glass substrate 11 and the photo resist 12. Although the photo resist is positive type one in this case, it is of course that a photo resist of negative type may be used. Meanwhile, it may be used such a process that after a mother die is produced from the stamper 14, another stamper for producing the substrate is produced from the mother die.

Figure 4F:
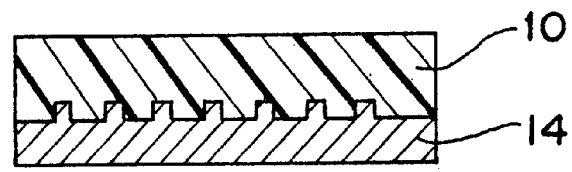

After that, as shown in FIG. 4F, the substrate 10 having the groove 8 and the prepits 9 is produced using the stamper 14, by means of injection molding, compression molding, 2P method or the like. Hereupon, a transparent plastic material (for example, polycarbonate resin or the like) is used as the material of the substrate 10.

In this case, the depths of the groove 8 and the prepits 9 become identical to the thickness of the photo resist 12. In consequence, if it is intended that the depths of the groove 8 and the prepits 9 are different from each other, the steps shown in FIGS. 4B to 4D must be repeated again using another photo resist having a different thickness after the developing treatment shown in FIG. 4D. Thereby, the process for producing the stamper 14 may be extremely complicated.

Figure 5B:
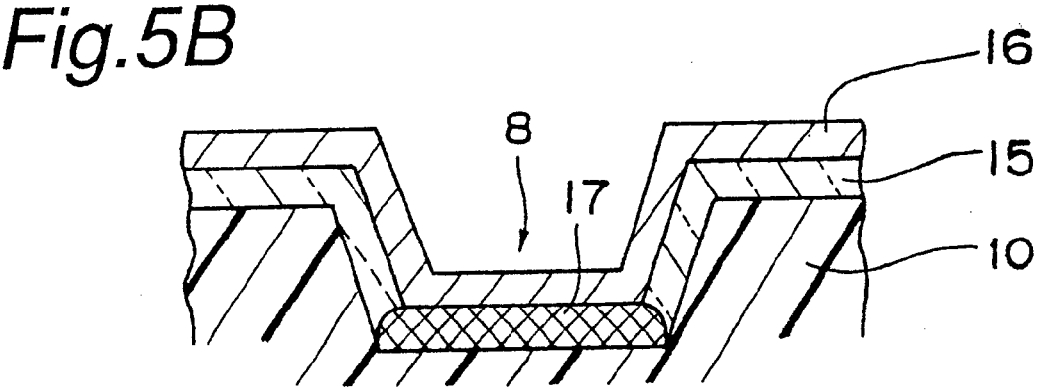
FIG. 5B is an elevational section view of the data area around the groove, of the write-once DVD into which data has been written.
Figure 5C:
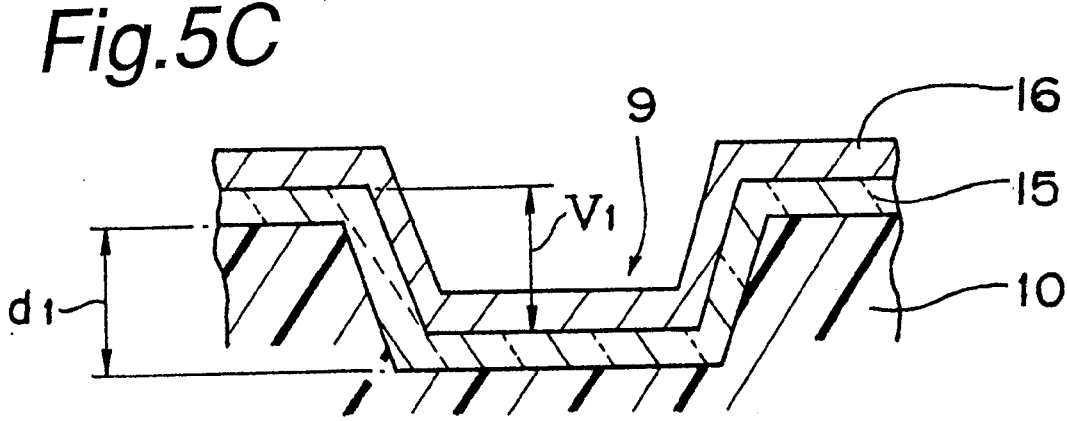
FIG. 5C is an elevational section view of a lead-in area around a prepit, of the write-once DVD.

As shown in FIGS. 5A and 5C, a recording layer 15 and a reflecting layer 16 are formed, by turns, on the whole spreading surface of the substrate 10 produced as described above. Therefore, the recording layer 15 and the reflecting layer 16 are also formed in the groove 8 and prepits 9 whose depths are identically $d_1$. Further, a covering plate (not shown) is attached onto the reflecting layer 16 so that the write-once DVD 1 is completed.

Hereupon, the recording layer 15 is composed of a pigment deposition film of a thin film type which has been formed by vapor-depositing an organic pigment (for example, organic pigment of porphyrin type, organic pigment of azo type) onto the spreading surface of the substrate 10. The pigment deposition film is formed, for example, by means of such a process that the organic pigment is heated and vaporized (sublimated) in a vacuum operation chamber under a lower pressure (for example, lower than or equal to $10^{-3}$ Torr), and then the vaporized pigment is cooled and solidified (vapor-deposited) on the spreading surface of the substrate 10. Meanwhile, the reflecting layer 16 is formed by vapor-depositing a metal with a higher reflection factor (for example, gold, silver, aluminum or the like) onto the recording layer 15 using a conventional metal deposition apparatus. Hereupon, the recording layer 15 may be composed of a pigment recording film which has been formed by means of a coating process such as spin coating process or the like.

Hereinafter, the conformity (matching property) of the reproducing property of the optical disk with prepits will be described. In particular, it will be described as to such a case that each of the prepits 9 is composed of embossment formed on the substrate 10. If information has been written into the DVD 1 by applying laser rays thereto using a DVD drive (DVD recorder), the optical property (for example, light transmitting factor) of a predetermined portion of the recording layer 15 in the groove 8 is changed (for example, refraction factor of the pigment is reduced by recording operation) so that the portion becomes the recorded layer 17 due to the phase change in the recording pits, as shown in FIG. 5B. Thus, the digital information is recorded in the DVD 1. That is, as for the groove 8, the information is recorded in the form of a group composed of many recorded layers 17 each of which has been formed on the basis of the change of the optical property of the recording layer 15.

On the other hand, in the case of the prepits 9, which differs from the case of the groove 8, the information is recorded in the form of pits, for example, as same as the case of a read-only CD (CD-ROM). That is, the information is recorded by means of patterns of the presence or shape of the prepits 9, on the basis of the phase difference due to the optical path length difference between the portion with prepits 9 and the portion without the prepits. Therefore, as for the prepits 9, the information has been recorded (stored) already at the time point that the DVD 1 is produced. That is, the prepits 9 are formed in the form corresponding to the information which is to be recorded into the prepit section, consequently the information is peculiar to the DVD 1.

Hereupon, as shown in FIG. 5C, the intensity of the signal detected at the prepit 9, namely the signal detecting precision becomes higher, as the distance $V_1$ (hereinafter, referred to "reflection surface interval") in the depth-wise direction of the prepits between the reflecting surfaces of the prepits 9 (interface between the pigment and the reflecting layer) and the reflecting surface of the portion without the prepits 9 (land portion) becomes larger. As described above, because the recording layer 15 of the DVD 1 is composed of the pigment deposition film of thin film type which has been formed by vapor-depositing the organic pigment onto the surface of the substrate, the reflection surface interval $V_1$ becomes larger. Therefore the intensity of the signal, which is detected at the prepits 9, becomes stronger, consequently the signal detecting precision is raised.

Figure 6A:
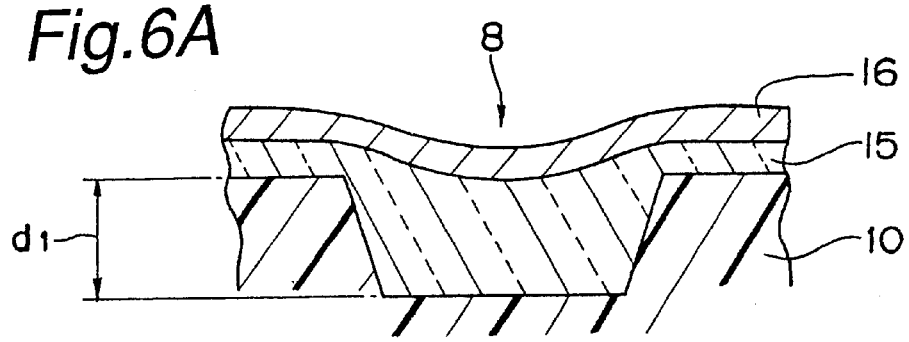
FIG. 6A is an elevational section view of a data area around a groove, of a non-recorded conventional write-once DVD.
Figure 6B:
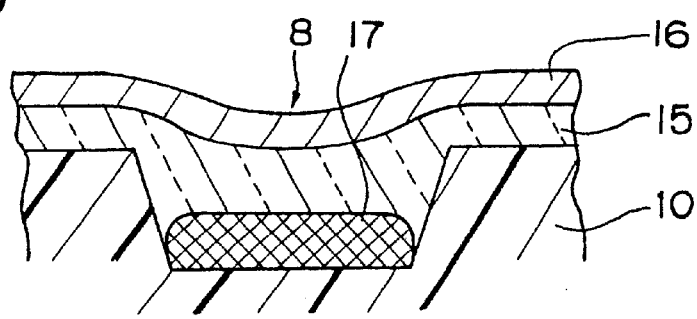
FIG. 6B is an elevational section view of the data area around the groove, of the write-once DVD into which data has been written.
Figure 6C:
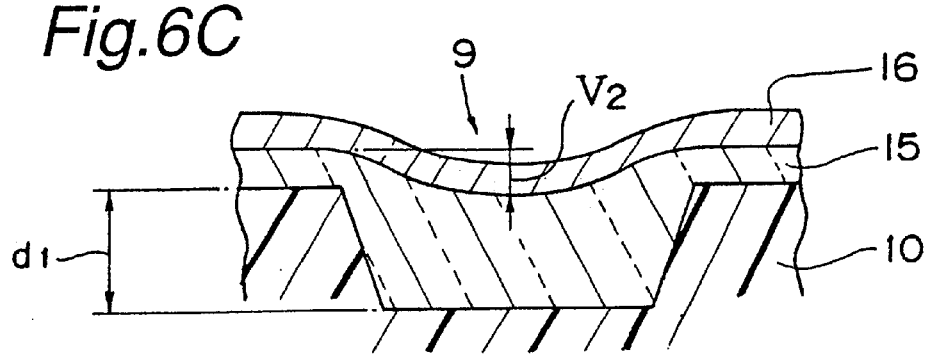
FIG. 6C is an elevational section view of a lead-in area around a prepit, of the write-once DVD.

On the other hand, as shown in FIGS. 6A and 6C, if the recording layer 15 is formed by applying the organic pigment onto the surface of the substrate (for example, performing spin coating), most parts of the groove 8 and the prepits 9 are buried with the recording layer 15 (organic pigment). In this case, as shown in FIG. 6B, any particular disadvantage does not occur as to the groove 8, because the recorded layer 17 can be formed without hindrance. However, as apparent from FIG. 6C, the reflecting surface interval $V_2$ becomes much smaller as for the prepits 9. Therefore the intensity of the signal detected at the prepits 9 becomes weaker so that the signal detecting precision may be lowered.

Figure 6D:
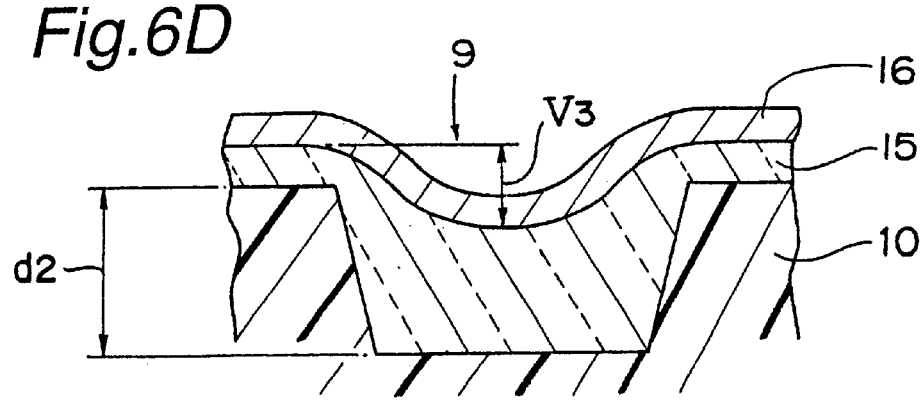
FIG. 6D is a view similar to FIG. 6C in such a case that the prepit is deep.

Hereupon, as shown in FIG. 6D, if the depth $d_2$ of the prepit 9 is made larger, the reflecting surface interval $V_3$ may become comparatively larger so that the signal detecting precision at the prepit 9 would be raised. However, in this case, there may occur such a disadvantage that the process for producing the stamper, which is used to produce the substrate 10, is complicated, as described above. Hereupon, a preferable depth d of the prepit is such a value in the range defined by the following expression 2.

$$\lambda/(4n) \geq d \geq \lambda/(12n) \quad \text{Expression 2}$$

d: preferable depth of the prepit
λ: wave length of the reproduced signal
n: refraction factor of the substrate Meanwhile, when information is recorded in a non-recorded DVD 1 using a DVD recorder (DVD drive), or the information recorded in the recorded DVD 1 is reproduced using a DVD player (DVD drive), a tracking error signal (hereinafter, referred to "TE signal") is detected, while the optical pickup (objective lens) is controlled in the tracking direction by servo control, on the basis of the TE signal. However, in the case of the DVD 1 according to the present invention, the intensity or amplitude of the TE signal detected during the recording or reproducing operation differs from that of the prepit 9.

Figure 7:
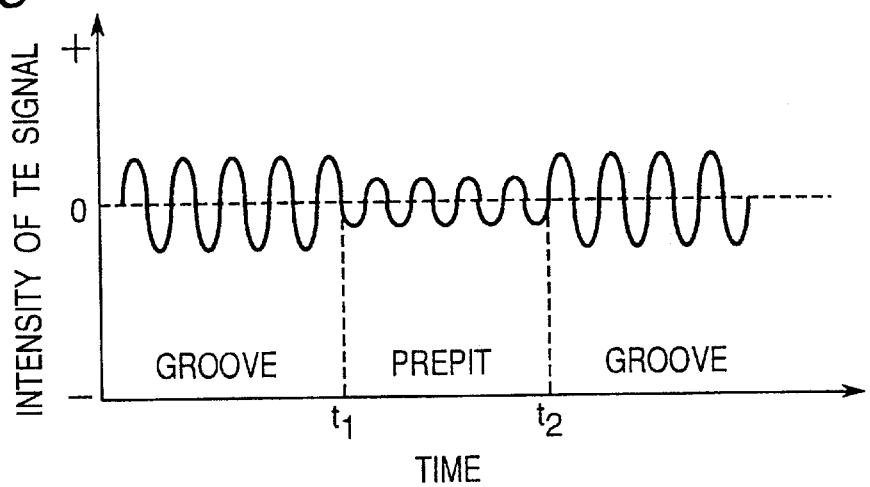
FIG. 7 is a graph showing changing characteristics with lapse of time, of the intensity of the TE signals of the write-once DVD according to the present invention.

FIG. 7 shows a changing characteristic with lapse of time of the intensity or amplitude of the TE signal, for example, when information recorded in the recorded DVD 1 is reproduced. In the reproducing operation, the TE signal is detected at the groove 8 in the test area 3 (or the lead-in area 4) before the time point of $t_1$, detected at the prepits 9 in the lead-in area 4 during the period from $t_1$ to $t_2$, and detected at the groove 8 in the data region 5 after the time point of $t_2$. As apparent from FIG. 7, the amplitude of the TE signal at prepits 9 ($t_1$ to $t_2$) is considerably smaller in comparison with the amplitude of the TE signal at the groove 8 (before $t_1$, or after $t_2$) Therefore, it is preferable that the amplitude of the TE signal of each of the groove 8 and the prepits 9 is adjusted in accordance with the properties of the TE signals.

Figure 8:
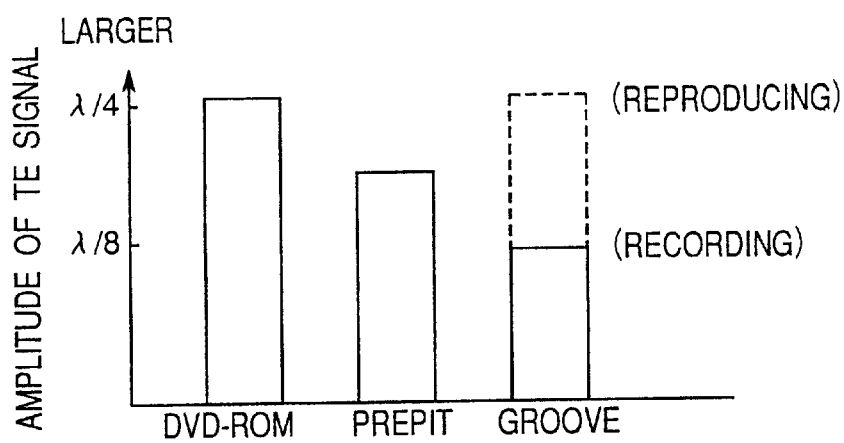
FIG. 8 is a graph showing the amplitude of the TE signals of each of the prepit and groove of the write-once DVD according to the present invention, and the DVD-ROM.

Moreover, FIG. 8 shows the magnitude of the amplitude of the TE signal of each of the groove 8 and prepits 9 in the DVD 1 according to the present invention, and a conventional read-only DVD (DVD-ROM). Hereupon, in the graph as to the groove 8 of the DVD 1 according to the present invention shown in FIG. 8, the solid line indicates the amplitude in the non-recorded condition (recording) while the broken line indicates the amplitude in the recorded condition (reproducing).

As apparent from FIG. 8, as for the groove 8 of the DVD 1, the amplitude of the TE signal detected when the information is recorded in the non-recorded DVD 1 (solid line) is about ½ of the amplitude of the TE signal detected when the information in the recorded DVD 1 is reproduced. Therefore, in order to cope with the above-mentioned amplitude differences, a push-pull tracking control is performed during the recording operation while a phase difference tracking control is performed during the reproducing operation. On the other hand, as for the prepits 9, the amplitude of the TE signal is constant, regardless of whether the DVD is non-recorded or recorded. Therefore, the prepits 9 must be able to produce TE signal having the amplitude, which can cope with the both tracking controls described above. Thus, in the DVD 1, the amplitude of the TE signal at the prepits 9 is set to a just middle value between the amplitude of the TE signal at the groove 8 of the non-recorded DVD 1 and the amplitude of the TE signal at the groove 8 of the recorded DVD 1 so as to be able to cope with the both tracking controls described above.

Further, when the information is recorded into the non-recorded DVD 1, or when the information recorded in the recorded DVD 1 is reproduced, there is performed a focus control, namely a servo control of the optical pickup in the focus direction, on the basis of the reflection factor of the laser rays at the reflecting surface. Hereupon, in the above-mentioned focus control, it is preferable that the reflection factor at the reflecting surface is constant as much as it can. However, the reflecting surfaces of the groove 8 and the prepits 9 have different reflection factors from each other. But the reflection factor of the groove 8 is not related to whether the DVD 1 is non-recorded or recorded (identical for the both).

Figure 9:
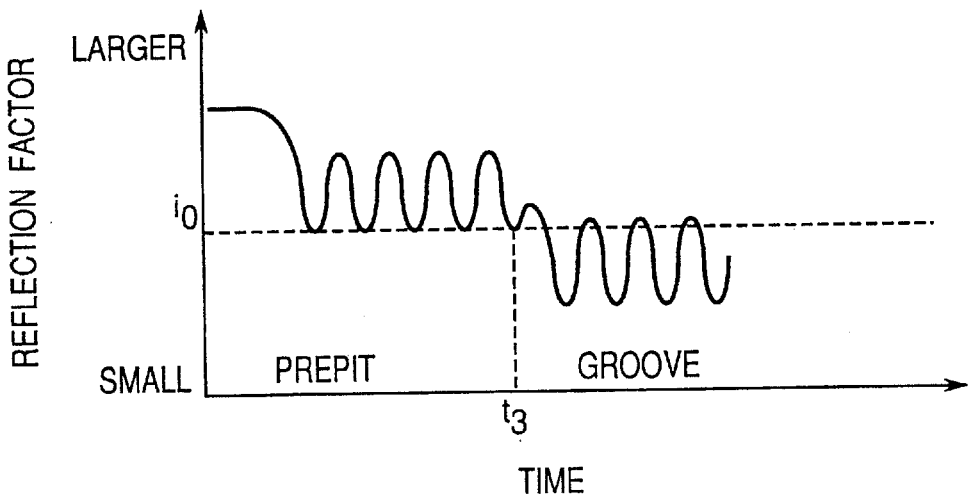
FIG. 9 is a graph showing changing characteristics with lapse of time, of the reflection factor of the write-once DVD according to the present invention.

FIG. 9 shows a changing characteristic with lapse of time of the reflection factor of the laser rays at the reflecting surface, for example, when the information recorded in the recorded DVD 1 is reproduced. In the reproducing operation, the information of the prepits 9 in the lead-in area 4 is reproduced before the time point of $t_3$, while the information of the groove 8 in the data area 5 is reproduced after the time point of $t_3$. As apparent from FIG. 9, the reflection factor at the prepits 9 (before $t_3$) is considerably higher than the reflection factor at the groove 8 (after $t_3$). Therefore, in the case that the DVD 1 according to the present invention is used, it is preferable that there is produced a condition which is equivalent to the condition that the reflection factor is lowered to a standard value $i_0$ by lowering the circuit gain of the focus control system when the information is reproduced or recorded at prepits 9, while there is produced a condition which is equivalent to the condition that the reflection factor is raised to the standard value $i_0$ by increasing the circuit gain when the information is reproduced or recorded at groove 8, so as to obtain an effect as same as of the case that the reflection factor of the groove 8 is identical to that of the prepits 9.

Because the depth of the prepit 9 in the DVD 1 is smaller than that of a conventional normal pit, the modulation factor (ratio of the longest signal 14T to the reflection factor) of the data signal (prepit signal) at the prepit section is lowered to about 30 to 40% in comparison with that of the data signal at the data area 5 (groove 8). Therefore, it is preferable to lower the recording density (line recording density, track density) in the prepit section, in order to improve the quality of the signal at the prepit section.

In the case that the depths of the groove 8 and the prepits 9 are, for example, identically 50 nm, the jitter values of the prepit signals at the density of 4.7 GB (track pitch being 0.74 $\mu$m, the shortest pit length being 0.4 $\mu$m) and at the density of 3.9 GB (track pitch being 0.8 $\mu$m, the shortest pit length being 0.44 $\mu$m) are as follows.

3.9 GB . . . prepit jitter value: 8%

4.7 GB . . . prepit jitter value: 13%

As described above, if the modulation factor is about 30%, a good signal quality can be obtained by lowering the recording density in the prepit section.

Further, it is preferable that every prepit section is alternately formed on the track, in the radial direction of the disk. Meanwhile, it is preferable to boost the prepit signal of electric signal state so as to improve the modulation factor. That is, it is preferable to lower the shortest recording frequency by changing the modulation rule so as to improve the signal quality (C/N).

Meanwhile, the prepits 9 in the DVD 1 may be formed by locally expanding the groove 8 (making the groove width wider).

That is, in order to smoothly connect the prepit section to the groove 8 in the data area 5 following the prepit section, it is necessary to provide a dummy groove area before the groove 8 in the data area 5. Hereupon, if any prepits 9 do not exist, there may occur such a disadvantage that the phase difference tracking can not be performed when the dummy groove area is reproduced using a reproducing player. However, the above-mentioned disadvantage can be solved by locally expanding the dummy groove area to form dummy pits.

In the write-once DVD 1 according to the present invention, the prepit section (prepits 9) have previously stored copy managing key information and disk type identifying information. Thus, when information in another DVD is to be copied to the DVD 1, it may be possible to prevent copying of the information on the basis of the information recorded in the prepit section if a predetermined condition to allow copying the information is not satisfied. Therefore, it may become possible to physically prevent the information recorded in a source disk such as a read-only DVD or the like from being copied without a just reason, by propagating the above-mentioned write-once DVD 1 and by applying any regulation for using of a conventional write-once (writable) DVD. Accordingly, the copyright as to the information recorded in the source disk can be effectively protected. Further, the disk information can be sufficiently managed when the information is read or written. That is, it may become possible to construct a system for sufficiently managing the disk information.

Hereinafter, there will be described a concrete structure of the DVD recorder (DVD drive), which can copy or record the information recorded in the source disk as a requisite information into the DVD 1 according to the present invention while preventing the copyright from being infringed.

As shown in FIG. 10, the DVD recorder 20 is provided with a source disk holding section 21 for holding a source disk such as a read-only DVD 18 (DVD-ROM) or a conventional recorded write-once DVD 19 (DVD-R) etc., and a copying section 22 which can fundamentally copy (record) the information in the source disk, which is held in the source disk holding section 21, into a non-recorded write-once DVD 1. Further, the DVD recorder 20 is also provided with a copy managing section 23 which can allow or inhibit a copying operation of the copying section 22, and a conformity condition information storing section 24 for storing information (conformity condition information) relating to various conditions for allowing to copy the information into the DVD 1. Hereupon, the conformity condition information is inputted to the conformity condition information storing section 24 through a telecommunication line or a potable recording medium, although it is not shown in detail.

In the DVD recorder 20, the copy management key information (key information for preventing copying), which is recorded (stored) at the prepit section (prepits 9) in the non-recorded DVD 1 held within the copying section 22, is read by a copy management key information reading section 25, and then the copy management key information is sent to a conformity judging section 26. Then information to be copied (hereinafter, referred to "copy information") such as document, image, video, voice, sound or the like, which is recorded in the source disk within the source disk holding section 21, is read by the copy information reading section 27, and then the copy information is sent to the copy managing section 23. Meanwhile, the copyright information, which is recorded in the source disk, is read by the copyright information reading section 28, and then the copyright information is sent to the conformity judging section 26. Moreover, the conformity condition information, which is stored in the conformity condition information storing section 24, is read by a conformity condition information reading section 29, and then the conformity condition information is sent to the conformity judging section 26.

Thus, in the conformity judging section 26, it is judged whether the copy management key information and the copyright information satisfy the conformity condition stored in the conformity condition information storing section 24 or not, namely whether copying the information recorded in the source disk to the DVD 1 satisfies a predetermined condition for allowing the copy or not, and then the resulting judgement is sent to the copy managing section 23. On that occasion, the conformity judging section 26 also sends the copyright information of the source disk, or information formed by combining (hybridizing) the copyright information with the information held in the prepit section, to the copy managing section 23.

Thus, for the copying section 22, the copy managing section 23 allows or inhibits to copy the copy information into the DVD 1, on the basis of the above-mentioned resulting judgement which has been sent thereto from the conformity judging section 26. To be concrete, if the copy management key information and the copyright information satisfy the conformity condition, namely if the copying operation does not correspond to an unjust action with a infringement of the copyright or the like so as to be permitted without questions, the copy information and the copyright information are sent from the copy managing section 23 to the copying section 22, and then the copy information and the copyright information are written into the DVD 1 by the copying section 22.

On the other hand, if the copy management key information and the copyright information do not satisfy the conformity condition, namely if the copying operation is an unjust action with a infringement of the copyright or the like, the copy information is not sent from the copy managing section 23 to the copying section 22 so that the copy information cannot be copied in the copying section 22. That is, in the DVD recorder 20, it is physically impossible to copy the information in the source disk to the DVD 1, if the copy management key information in the DVD and the copyright information in the source disk do not satisfy the conformity condition. Therefore, if the above-mentioned conformity condition is preferably set to such that the condition is satisfied only when the information of the source disk is permitted to be copied into the DVD 1, the information recorded in the source disk can be physically prevented from being copied to the DVD 1 without a just reason so that the copyright as to the information recorded in the source disk can be effectively protected.

Hereinafter, there will be described a concrete structure of a DVD player (DVD drive), which can reproduce the information recorded in the source disk such as the read-only DVD 18 or the recorded DVD 1 into which is information has been written by the above-mentioned DVD recorder 20, while effectively preventing the copyright from being infringed.

As shown in FIG. 11, the DVD player 30 is provided with a reproducing section 31 which can reproduce the information recorded in the disk to be reproduced (hereinafter, referred to "reproduction disk") such as the read-only DVD 18 or the recorded DVD 1 etc., and a reproduction managing section 32 which can allow or inhibit an information reproducing operation for the reproducing section 31. Further, the DVD player 30 is provided with a conformity condition information storing section 33 for storing information (conformity condition information) relating to various conditions for allowing to reproduce the information of the reproduction disk.

In the DVD player 30, it is judged whether the reproduction disk held in the reproducing section 31 is the recorded DVD 1 or the read-only DVD 18 (or other conventional DVDs). Thus, if the reproduction disk has been judged as the read-only DVD 18, the resulting judgement is sent to the reproduction managing section 32. In this case, for the reproducing section 31, the reproduction managing section 32 allows the reproduction of the information if key information for inhibiting a reproducing operation for the read-only DVD 18 is not contained, while the section inhibits the reproduction of the information if the key information for inhibiting the reproducing operation is contained. That is, as for the DVD player 30, information recorded in the read-only DVD 18 or other normal DVDs can be reproduced approximately as same as the case of a conventional DVD player.

On the other hand, if the reproduction disk has been judged as is the recorded DVD 1 by a disk type judging section 34, the resulting judgement is sent to a conformity information reading section 35. In this case, the conformity information reading section 35 reads copy management key information and copyright information recorded in the DVD 1 within the reproducing section 31, and then sends the information to a conformity judging section 36.

Meanwhile, conformity condition information stored in the conformity condition information storing section 33 is read by a conformity condition information reading section 37, and then the conformity condition information is sent to the conformity judging section 36.

Thus, in the conformity judging section 36, it is judged whether the copy management key information and the copyright information satisfy the conformity condition or not, namely whether the information recorded in the DVD 1 satisfies a predetermined condition for allowing the reproduction or not, that is whether the information is not recorded by an unjust action with an infringement of the copyright, and then the resulting judgement is sent to the reproduction managing section 32.

Thus, for the reproducing section 31, the reproduction managing section 32 allows or inhibits to reproduce the information of the DVD 1, on the basis of the above-mentioned resulting judgement which has been sent thereto from the conformity judging section 36. Hereupon, if the copy management key information and the copyright information satisfy the conformity condition, namely if the information to be reproduced has been recorded by a just process, reproduction of the information of the DVD 1 in the reproducing section 31 is permitted so that the information of the DVD 1 is reproduced.

On the other hand, if the copy management key information and the copyright information do not satisfy the conformity condition, namely if the information to be reproduced has been recorded by an unjust process, reproduction of the information of the DVD 1 in the reproducing section 31 is inhibited.

As described above, when the. information in the recorded DVD 1 is reproduced by the DVD player 30, reproducing the recorded information is inhibited if the copy management key information and the copyright information do not satisfy the conformity condition. Therefore, if by any chance the information, which has been inhibited from being copied, is copied to the DVD 1 by mistake, it is physically impossible to reproduce the recorded information. In consequence, the copyright as to the information recorded in the source disk can be strongly protected.

Hereupon, it is of course that the above-mentioned DVD recorder 20 and DVD player 30 may be integrally constructed so as to form a DVD recorder/player.

In the DVD 1, DVD recorder 20 or DVD player 30, the frequency for reading the signal at the prepit section (prepits 9) may be different from the frequency for reading the signal at the groove 8. Meanwhile, the modulation rules for the signals recorded in the prepit section (prepits 9) and the groove may different from each other. Hereupon, it is desirable that the prepit section can be read with lower frequency during the reproducing operation, in comparison with the other. The DVD player 30 obtains the information by turns from the groove portion, the pit portion and the groove portion.

Further, in the DVD recorder 20 or the DVD player 30, the conformity condition may be stored together with the conformity information in the prepit section. Further, for example, in a DVD or the like into which a commercial message is recorded, it may be possible such a matter that a specified sponsor buys the copyright, and then the sponsor permit the copy of the information in compensation for recording the commercial message into the DVD.

INDUSTRIAL APPLICABILITY

As described above, each of the optical disk and the optical disk drive according to the present invention is useful as an optical storage medium which can prevent the information recorded in the optical disk from being unjustly copied or reproduced, and is particularly suitable for using as a DVD or a driving apparatus thereof, or a CD or a driving apparatus thereof.

What is claimed is:

1. An optical disk, in which requisite information of a digital type can be written into a recording layer that is read using a light, said optical disk comprising:

a data area having a groove extending along a spiral track, said data area being able to record said requisite information in the recording layer within the groove;

a lead-in area disposed at a position preceding said data area, said lead-in area being able to record information for managing the optical disk; and a pre-groove area disposed at a position preceding said lead-in area, said pre-groove area having a pre-groove extending along said track, wherein a prepit section is provided at a position corresponding to said track within said lead-in area, said prepit section including at least prepits which have previously stored key information relating to a regulation against copying information into the optical disk, and other prepits which have previously stored information for identifying whether the optical disk is provided with said prepits.

2. The optical disk according to claim 1, wherein said recording layer comprises a vapor-deposited pigment film.

3. The optical disk according to claim 1, wherein a width of each of said prepits is one of larger than and equal to a width of said groove, and is smaller than a half of a track pitch value.

4. The optical disk according to claim 1, wherein a depth of each of said prepits is approximately equal to a depth of said groove.

5. The optical disk according to claim 1, wherein said optical disk comprises a write-once DVD.

6. The optical disk according to claim 5, further comprising a CSS key area disposed in said lead-in area that stores key information for deciphering the requisite information which has been ciphered and recorded in said data area, wherein one of a partial area including said CSS key area in said lead-in area and all of said lead-in area is formed of prepits.

7. The optical disk according to claim 6, wherein a modulation factor of each of said prepits is at least equal to 30%, and a jitter thereof is not greater than 8%.

8. An optical disk drive which can copy data information recorded in an optical disk acting as an information source, in which the data information has been previously recorded, to a non-recorded optical disk with prepits according to claim 1, said data information being a requisite information, said optical disk drive comprising:

an information copying inhibitor that reads key information relating to a copying regulation, stored in a prepit section of said non-recorded optical disk with the prepits and copyright information relating to a copyright, recorded in the optical disk acting as the information source to compare with each other, and then inhibits said data information from being copied if said key information and said copyright information do not satisfy a predetermined conformity condition.

9. The optical disk drive according to claim 8, further comprising a copyright information writer that writes one of said copyright information and said information formed by combining said copyright information with said information stored in said prepit section, into the optical disk with the prepits, when said data information recorded in said optical disk acting as the information source is copied to the optical disk with the prepits.

10. An optical disk drive which can reproduce data information recorded in each of a read-only optical disk and a recorded optical disk with prepits according to claim 1, to which the data information has been copied using an optical disk drive, said optical disk drive comprising:

an optical disk type determiner that judges whether an optical disk from which recorded data information is to be reproduced is one of the read-only optical disk and the recorded optical disk with the prepits; and an inhibitor that inhibits the recorded data information from being reproduced, wherein when said optical disk from which the recorded data information is to be reproduced is judged to be the read-only optical disk, the recorded data information is allowed to be reproduced when said read-only optical disk does not store key information for inhibiting reproduction thereof, but the recorded data information is inhibited from being reproduced when said read-only optical disk stores the key information for inhibiting reproduction thereof, while when said optical disk from which the recorded data information is to be reproduced is judged to be the recorded optical disk with the prepits, copyright information relating to a copyright and key information relating to a copying regulation are read from the optical disk with the prepits and compared with each other, said recorded data information being inhibited from being reproduced when the a result of the comparison does not satisfy a predetermined conformity condition.

\* \* \* \* \*

UNITED STATES PATENT AND TRADEMARK OFFICE
CERTIFICATE OF CORRECTION

PATENT NO.    : 6,633,534 B1
DATED         : October 14, 2003
INVENTOR(S)   : Y. Tosaki et al.

It is certified that error appears in the above-identified patent and that said Letters Patent is hereby corrected as shown below:

Column 18,
Line 53, delete "the".

Signed and Sealed this

Twenty-second Day of June, 2004

JON W. DUDAS
*Acting Director of the United States Patent and Trademark Office*